Oct. 28, 1941.  R. M. HVID  2,260,975
INTERNAL COMBUSTION ENGINE
Filed Aug. 15, 1938  6 Sheets-Sheet 1
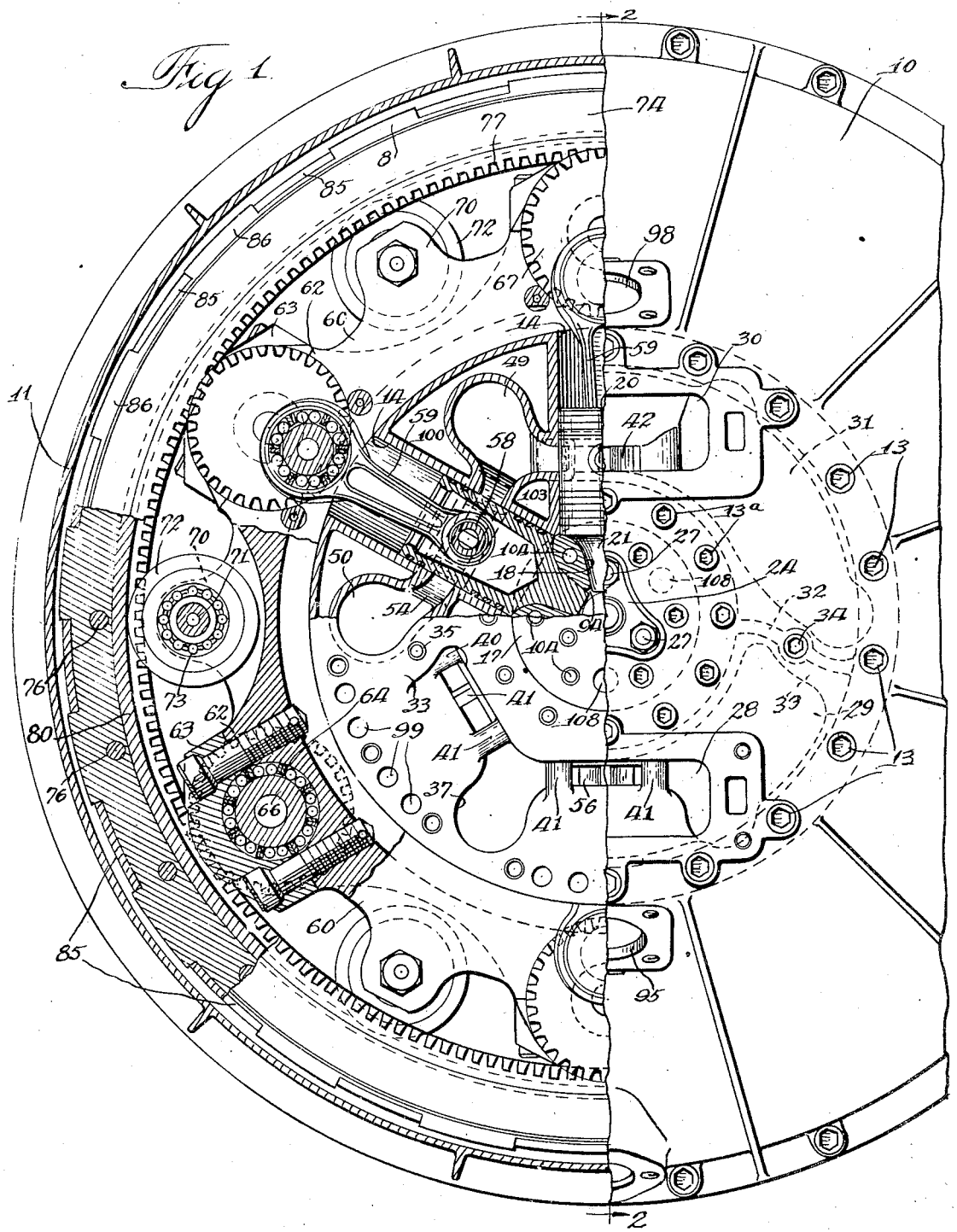
Inventor
Rasmus M. Hvid
By Amos Thiess Olson & Mecklenburger
Attys.

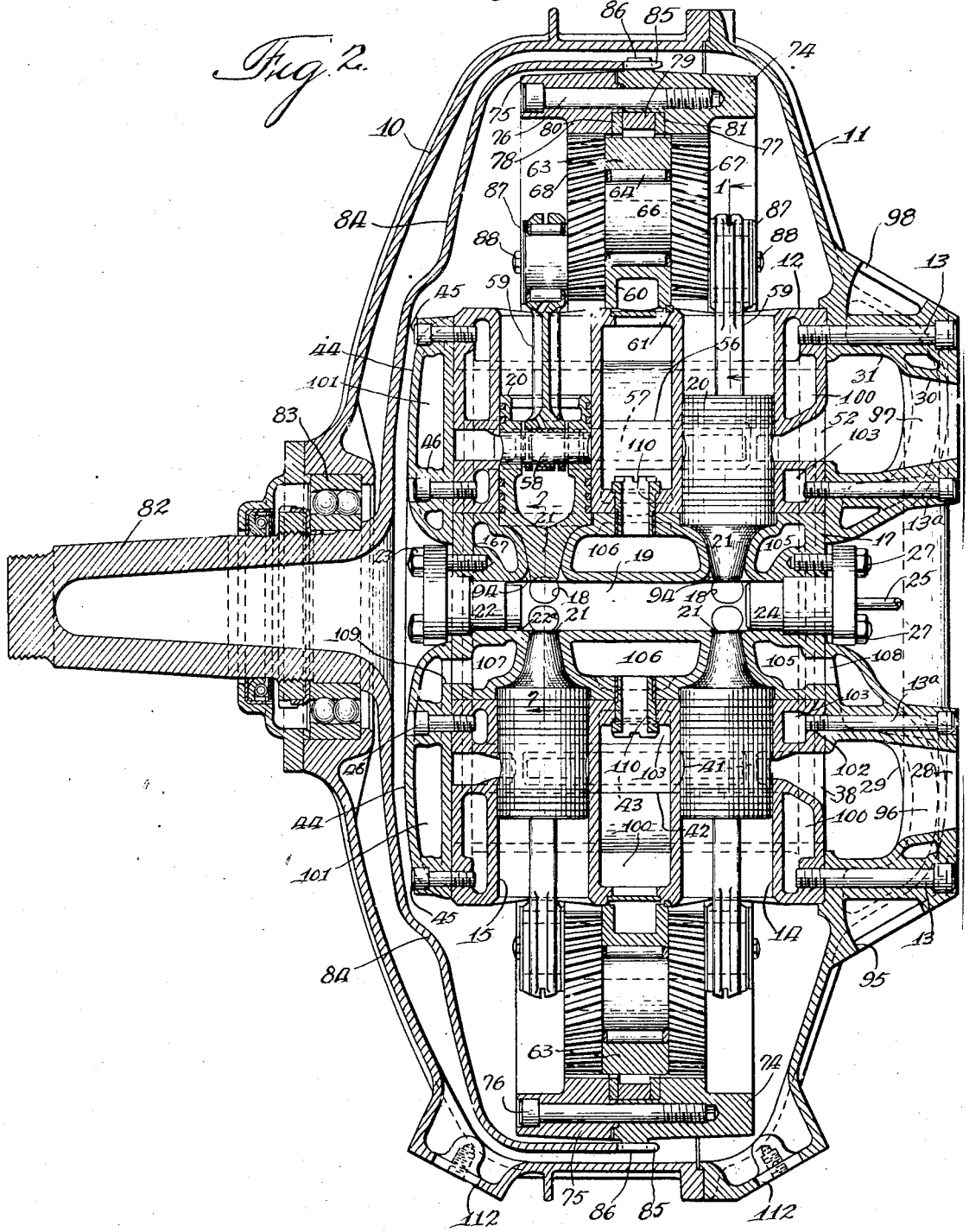

Oct. 28, 1941.    R. M. HVID    2,260,975
INTERNAL COMBUSTION ENGINE
Filed Aug. 15, 1938    6 Sheets-Sheet 3
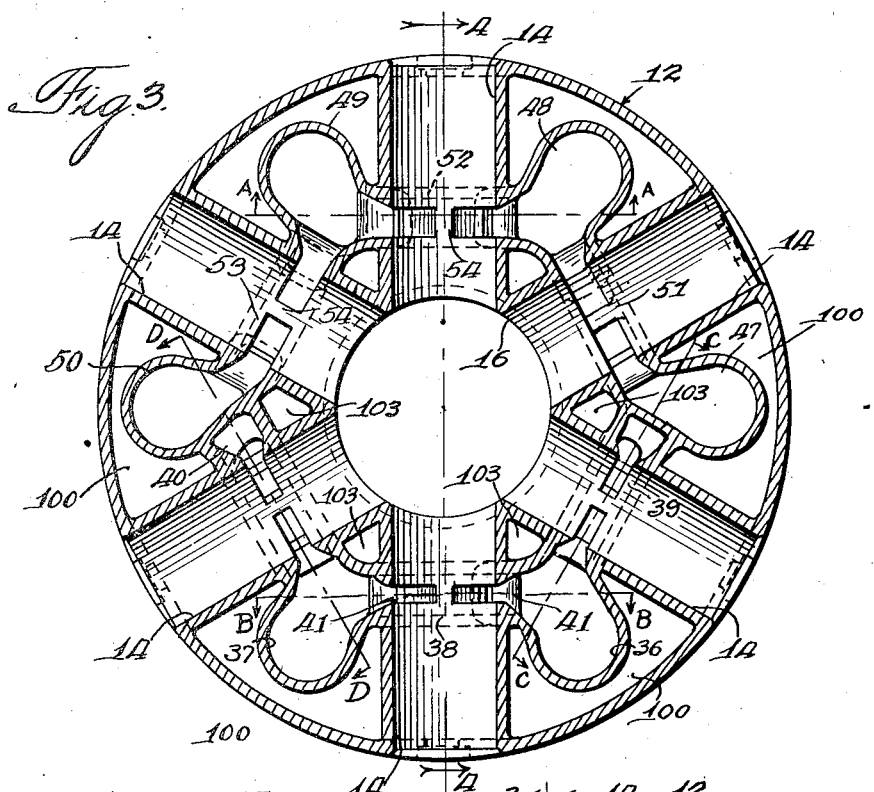
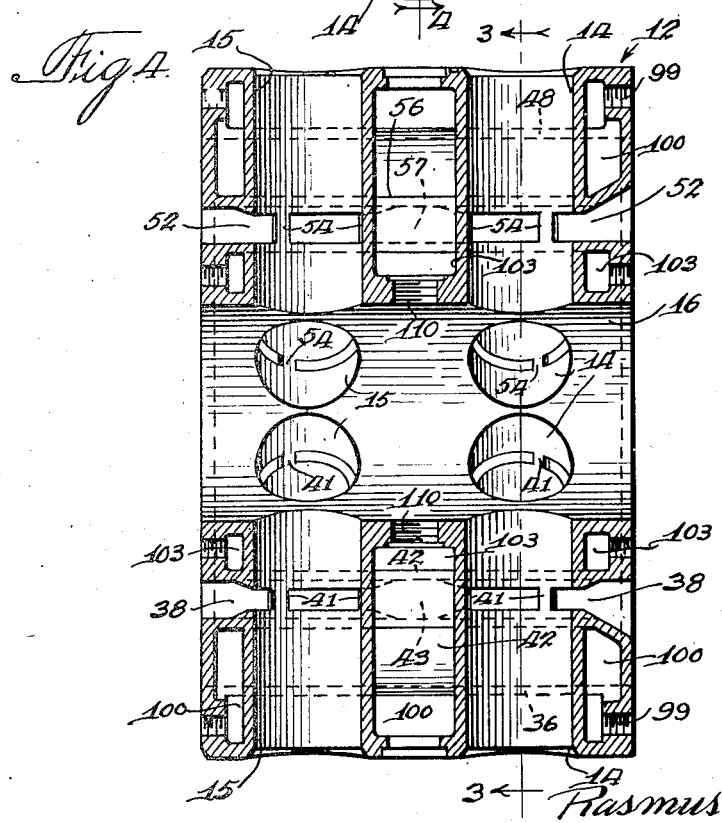

Oct. 28, 1941.  R. M. HVID  2,260,975
INTERNAL COMBUSTION ENGINE
Filed Aug. 15, 1938    6 Sheets-Sheet 4
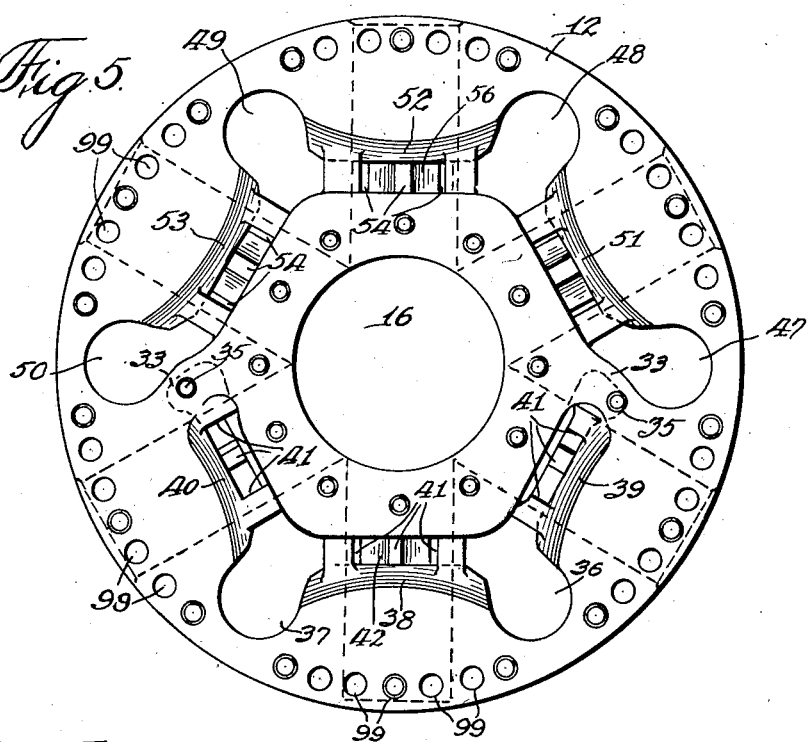
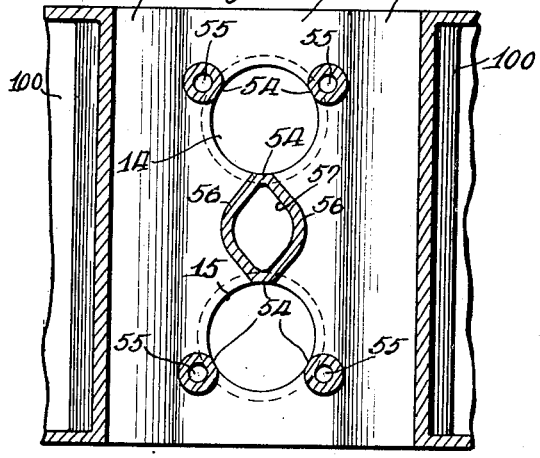
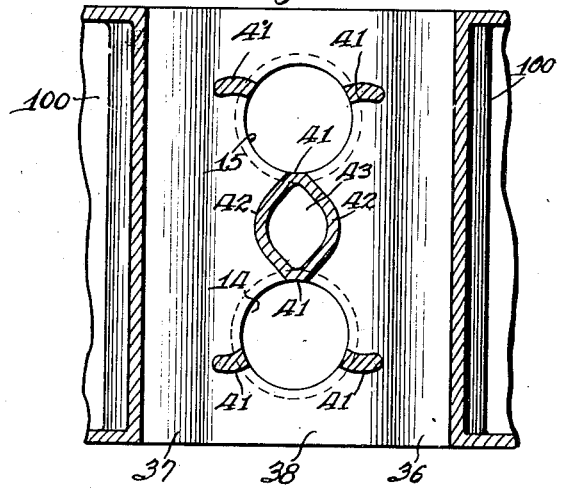

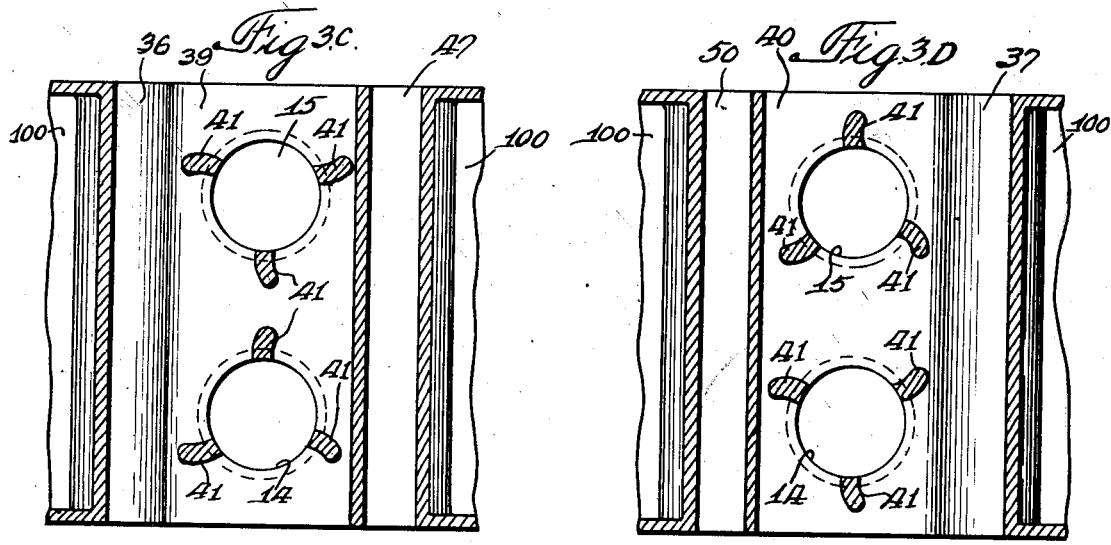
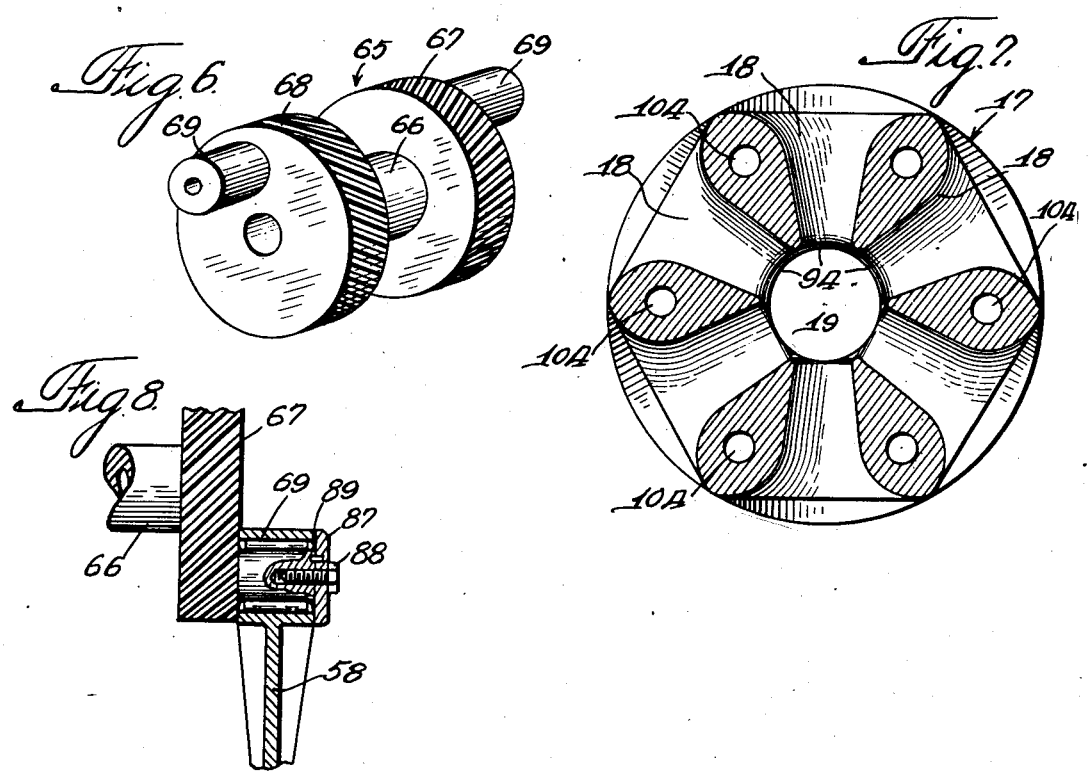

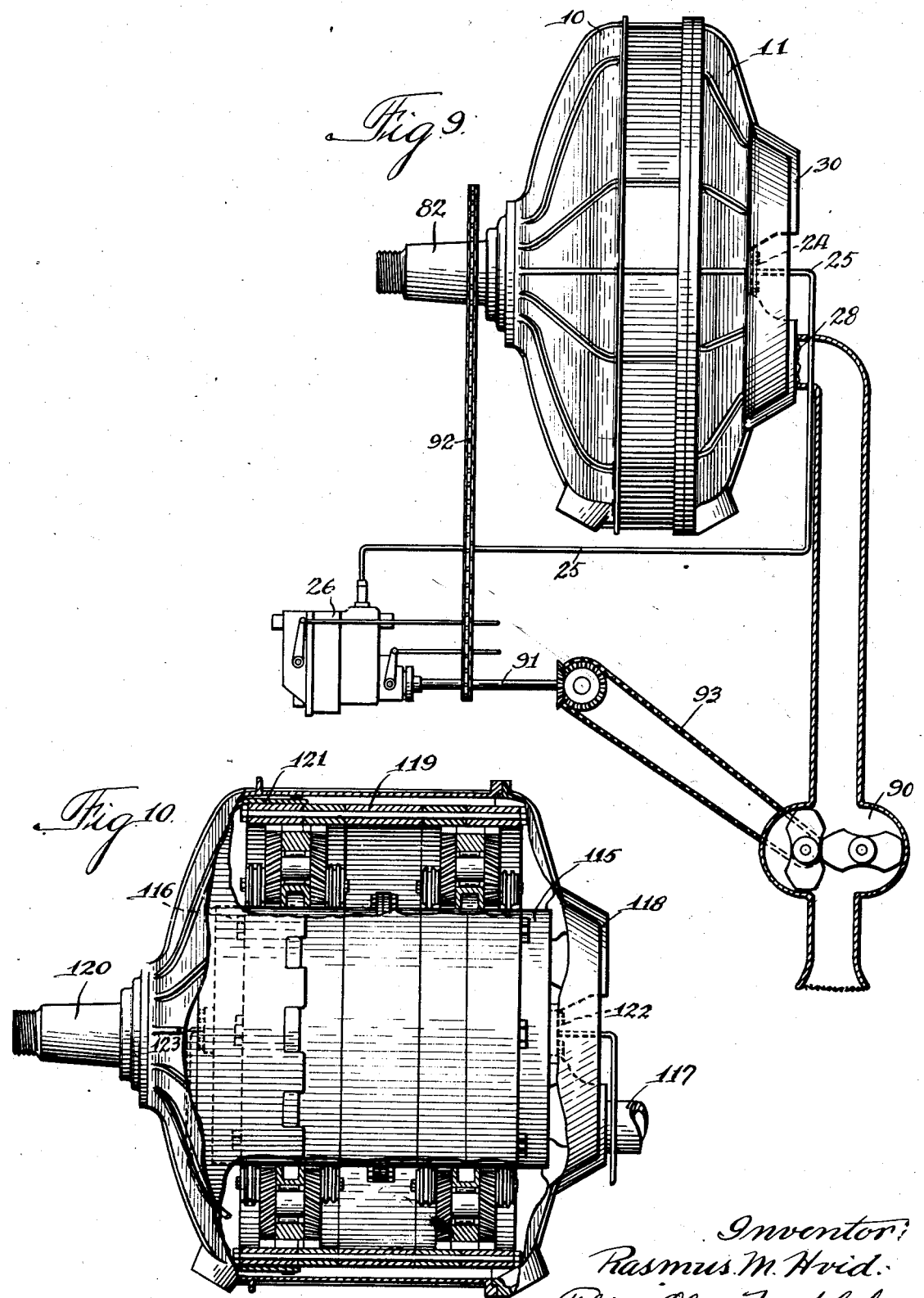

Patented Oct. 28, 1941

2,260,975

UNITED STATES PATENT OFFICE 2,260,975

INTERNAL COMBUSTION ENGINE

Rasmus M. Hvid, Wilmette, Ill.

Application August 15, 1938, Serial No. 224,940

6 Claims. (Cl. 123—55)

My invention relates to internal combustion engines of the radial type, more particularly to compression-ignition engines, and has for an object the provision of a compact lightweight and efficient engine of this character which may be constructed economically.

Various compression-ignition engines have heretofore been proposed and constructed both for two-cycle and for four-cycle operation, and many of such prior engines have been found highly satisfactory for use in various fields. One of the principal objections to the use of compression-ignition engines in the automotive and aviation fields is found in the excessive weight of such engines, and many recent attempts have been made to provide lightweight, high speed compression-ignition engines particularly adapted to use in these fields. Such attempts have not been entirely satisfactory, however, and it is accordingly a further object of my invention to provide an improved compression-ignition engine of this character.

A specific object of my invention is to simplify the cylinder block construction of a radial type internal combustion engine and to provide a balanced arrangement which may be economically constructed and which is more compact than any heretofore constructed engine with which I am familiar.

In carrying out my invention in one form, I provide a cylinder block having a centrally located, axially extending passageway therethrough and a plurality of radially extending cylinder bores terminating in the passageway, together with a head positioned in the passageway and co-operating with the cylinder bores to form one or more compression or combustion chambers at the inner ends of the cylinder bores. A plurality of crank shafts spaced about the periphery of the block are individually connected to one or more pistons in the cylinders by outwardly extending connecting rods, and an annular flywheel surrounding the cylinder block is provided with internal teeth meshing with suitable gears carried by the crank shafts. The flywheel is thus driven by the pistons, and the ratio between the gears and the flywheel teeth is such that each piston moves through a multiplicity of power strokes during each revolution of the flywheel.

For a more complete understanding of my invention, reference should now be had to the drawings, in which:

Figure 1 is an end view partly in elevation of the internal combustion engine embodying my invention, the right-hand half of Fig. 1 being partly broken away, the lower left-hand quadrant of Fig. 1 illustrating the end of the cylinder block with its cover plate removed, the upper left-hand quadrant of Fig. 1 being in section substantially along the line 1—1 of Fig. 2, and the extreme left-hand portion of the two left-hand quadrants of Fig. 1 being further broken away to provide a sectional view taken substantially through the center of one of the crank shafts hereinafter described;

Fig. 2 is an elevational sectional view taken along the line 2—2 of Fig. 1;

Fig. 3 is a sectional view of the cylinder block taken along the line 3—3 of Fig. 4;

Figs. 3A, 3B, 3C, and 3D are respectively fragmentary sectional views taken along the section lines A—A, B—B, C—C, and D—D of Fig. 3;

Fig. 4 is an elevational sectional view taken along the line 4—4 of Fig. 3;

Fig. 5 is an end view of the cylinder block illustrated in Figs. 3 and 4;

Fig. 6 is a detailed perspective view of one of the crank shaft units embodying my invention;

Fig. 7 is a sectional view taken along the line 7—7 of Fig. 2;

Fig. 8 is a detailed view partly in section illustrating the connection of the connecting rods to the crank shafts in the embodiment of my invention shown in Figs. 1 and 2;

Fig. 9 is a somewhat diagrammatic view illustrating one form of fuel supply means that may be utilized in connection with my improved internal combustion engine; and Fig. 10 is a somewhat diagrammatic elevational view partly in section of a further embodiment of my invention.

Referring now to the drawings, I have shown my invention as applied to a compression-ignition radial type internal combustion engine comprising an outer casing formed of two hollow castings 10 and 11 within which is supported a substantially cylindrical casting 12 which forms the cylinder block for my internal combustion engine, the block 12 being secured to the portion 11 of the outer casing by a plurality of bolts 13 and 13a, as shown.

The cylinder block 12, as shown best in Figs. 3, 4, and 5, consists of a unitary casting formed to provide a plurality of radially extending cylinder bores 14 arranged in a common transverse plane through the cylinder block, and a plurality of similar radially extending cylinder bores 15 arranged in a different common transverse plane through the cylinder block, the cylinder bores 15 being axially spaced with respect to the cylinder bores 14. It will be observed that in the particular embodiment shown, twelve cylinder bores are provided consisting of two axially spaced groups, each group constituting six radially extending cylinder bores and each cylinder bore being arranged in diametrically opposed relation to a similar cylinder bore. By reason of this diametrically opposed relation of the various cylinder bores, it is possible to bore out the cylinders by the simple expedient of inserting a boring tool entirely through the cylinder block along a diametric line.

Extending entirely through the cylinder block 12 in an axial direction, I provide a substantially cylindrical passageway 16 intersecting all of the radially extending cylinder bores 14 and 15 at the inner ends thereof, and in order to provide combustion chamber means for each of the cylinder bores, a substantially cylindrical head 17 is provided, adapted to be disposed within the transverse passageway 16. In assembling the head 17 within the block 12, the two parts are preferably machined so that the outer diameter of the head 17 is substantially identical in size to the inner diameter of the passageway 16 in the block 12 and the head 17 is cooled, preferably by packing in dry ice, while the cylinder block 12 is heated prior to the insertion of the head 17 into the passageway 16. As will be well understood by those skilled in the art, the respective cooling and heating of the parts 17 and 12 prior to assembly provide a shrink fit so that the head 17, after the parts return to equal temperatures, is rigidly and permanently positioned within the axial passageway 16 in the block 12.

As shown best in Figs. 1, 2, and 7, the head 17 is provided with a plurality of tapered apertures 18, the outer ends of which coincide with the inner ends of the cylinder bores 14 and 15, the inner ends of the apertures 18 terminating in a centrally located compression chamber or combustion chamber 19 which extends axially through the head 17. I have found that by tapering the apertures 18, as shown, and thus providing reduced end portions on the cylinders, I am able to provide a more compact cylinder block construction. As shown best in Figs. 1 and 3, the cylinder bores 14 and 15, at the respective points of intersection with the annular passage 16, closely approach each other and could not be further extended toward the center of the block without intersecting each other. Thus, a longer piston stroke could be provided only by reducing the diameter of the cylinders or by increasing the external diameter of the cylinder block. By providing reduced end portions on the cylinders through the provision of the tapered apertures 18 in the head 17, however, I am able to extend each of the cylinders to a point closely adjacent the axis of the head 17 without any of the cylinders intersecting each other.

Disposed in each of the cylinder bores 14 and 15 for movement inwardly and outwardly therein, I provide a plurality of pistons 20, the inner end of each piston being provided with a reduced portion 21 which conforms to the shape of the associated tapered aperture 18, so that when the pistons 20 occupy their innermost positions, as shown in Fig. 2, substantially zero clearance is provided in the cylinder bores, all of the necessary clearance being provided by the compression chamber 19. The left-hand end of the compression chamber is closed and tightly sealed by a plug 22 secured to the head 17 by suitable bolts 23, and if it is desired to adjust the compression ratio of the engine, this plug 22 may be adjusted laterally so as to increase or decrease the volume of the compression chamber. This adjustment may be accomplished in any suitable manner as, for example, by shaving off the inner end face of the plug 22 or by lengthening the plug. The opposite end of the compression chamber 19 is closed and sealed by a fuel injecting device 24 which may be of a type well known in the art and which, as will be more fully described hereinafter, is connected by a conduit or tube 25 to a fuel pump 26 (Fig. 9). As shown, the fuel injector means 24 is secured to the cylinder head 17 by suitable bolts 27.

It is sometimes desirable to provide a so-called "hot spot" in the combustion chamber of a compression-ignition engine and, if desired, this may easily be accomplished in my improved engine simply by cutting back the plug 22 for a portion of its length to provide a slight clearance between the plug and the surrounding wall of the head 17, as indicated by the reference numeral 22a. This clearance space reduces the transfer of heat from the plug 22 to the head 17 which, as will be hereinafter described, is provided with suitable cooling water spaces, and the inner end of the plug 22 thus forms a "hot spot" which is directly opposite the fuel injecting device 24, and the temperature of this "hot spot" may be adjusted by increasing or decreasing the extent of the clearance space 22a.

As is well understood by those skilled in the art, operation of an internal combustion engine of the compression-ignition type is accomplished by introducing a charge of air into the cylinder, by compressing this air during the compression stroke of the piston, and by then injecting into the highly compressed air within the clearance space of the cylinder a charge of atomized fuel, whereupon combustion of the charge takes place so as to effect a power stroke of the piston. The products of combustion are then exhausted from the cylinder and the cycle is repeated. In my improved engine I provide means for introducing compressed air through valve ports in certain of the cylinders and for exhausting the gases of combustion through valve ports in certain other cylinders, and since all of the cylinders communicate with a common combustion chamber, the compressed air is utilized to assist in scavenging the products of combustion from the cylinders and the combustion chamber.

Thus, as shown best in Figs. 1 and 2, the member 11 is provided with an intake manifold port 28 communicating with the lower portion 29 of an annular passageway formed in the member 11 and with an exhaust manifold port 30 communicating with an upper portion 31 of the same annular passageway, a pair of transversely extending walls 32, only one of which is shown in Fig. 1, serving to divide the annular passageway into the two chambers respectively indicated by the reference numerals 29 and 31. These transverse walls 32, which constitute part of the member 11, are adapted to rest upon suitable bearing portions 33 (Fig. 1) on the end face of the cylinder block 12, and in order to insure a tight seal therebetween, each of the transverse walls 32 is provided with an enlarged portion for receiving a bolt 34 which extends through the wall 32 and engages a suitable threaded aperture 35 in the bearing surface 33.

Extending axially through the cylinder block 12 in the spaces between the three lowermost cylinder bores, as viewed in Figs. 3 and 5 particularly, I provide a pair of inlet passageways 36 and 37 which terminate at their right-hand ends in the inlet chamber 29, Fig. 2. These passageways 36 and 37 are interconnected by a flat channel portion or passageway 38 which extends axially of the cylinder block 12 and intersects the cylinder bores 14 and 15 between the passageways 36 and 37. Similar flat passageways 39 and 40 extend outwardly from the passageways 36 and 37, respectively, so as to intersect the cylinder bores 14 and 15 on each side of the passageways 36 and 37. It will thus be apparent that the intersection of the cylinder bores 14 and 15 with the passageways 38, 39, and 40 is effective to provide inlet ports in the cylinder bores, which inlet ports extend entirely around the circumference of the cylinder bores except for the interposition of bridging members 41, which extend across the passageways and form part of the cylinder walls, there being three of these bridging members associated with each of the cylinder bores.

Although these bridging members 41 may be of any desired shape, I prefer to form these bridging members in the form of vanes, as shown in Figs. 3B, 3C, and 3D, the curvature of the vanes being such as not to interfere with the flow of compressed air into the cylinder bores from the transverse passageways. As shown in Fig. 3B, two of the bridging members 41, associated with the cylinder bores 14 and 15 which intersect the transverse passageway 38, are interconnected by walls 42 so as to form a passageway 43 extending at right angles to the inlet pasageway 38. This passageway 43 is for the purpose of permitting cooling water to flow therethrough as will be more fully explained hereinafter. It will now be apparent that compressed air, upon being introduced through the inlet manifold port 28 into the annular chamber 29, will flow through the transverse passageways 36 to 40, inclusive, and through the inlet ports formed thereby in the walls of the cylinder bores. As shown best in Fig. 2, the passageways 36 to 40, inclusive, extend entirely through the cylinder block 12, and the left-hand ends thereof are closed and sealed by a cap plate 44 which is secured to the left-hand end of the cylinder block by suitable bolts 45 and 46.

In order to provide for the removal of exhaust gases from the cylinders, I provide a plurality of axially extending exhaust passageways 47, 48, 49, and 50 arranged in the spaces between the radially extending cylinder bores, which exhaust passageways are identical with the inlet passageways 36 and 37 and extend entirely through the cylinder block 12 in an axial direction. Interconnecting these exhaust passageways and arranged to intersect the three uppermost cylinder bores 14 and the three uppermost cylinder bores 15 are a plurality of flat passageways 51, 52, and 53, similar to the hereinbefore described inlet passageways 38, 39, and 40. The intersection of the passageways 51, 52, and 53 with the associated cylinder bores forms exhaust ports in the walls of the cylinder bores in the manner described above in connection with the inlet ports, the exhaust ports likewise extending entirely around each cylinder wall except for the bridging members 54 which extend across passageways 51, 52, and 53 and form portions of the cylinder walls. As shown best in Fig. 3A, two of the bridging members 54 associated with each cylinder are formed as hollow lugs so as to provide passageways 55 through which cooling water may flow, the other bridging member associated with each cylinder being connected by the walls 56 to a similar bridging member on an associated cylinder so as to form a cooling water passageway 57, similar to the passageway 43 shown in Fig. 3B, for conducting cooling water through the block 12 in proximity to the exhaust passageways.

As will be apparent upon inspection of Fig. 2, the cap 44 which seals the left-hand end of the inlet passageways 36 to 40, inclusive, likewise seals the left-hand end of the exhaust passageways 47 to 53, inclusive, and accordingly exhaust gases issuing from the cylinders through the exhaust ports and into these exhaust passageways will be conducted to the exhaust chamber 31 and out of the exhaust manifold port 30. It will, of course, be understood that opening and closing of both the inlet ports and the exhaust ports in the cylinder walls is controlled by movement of the pistons 20 within the cylinders, all of the inlet ports and exhaust ports being open when the pistons occupy their outermost positions and all of the inlet ports and exhaust ports being closed upon movement of the pistons toward their innermost positions. For a purpose to be explained more fully hereinafter, the exhaust ports in the uppermost cylinders are arranged to open a short interval before the inlet ports in the lowermost cylinders open.

As shown, each of the pistons 20 is provided with a plurality of piston rings for the purpose of tightly sealing the cylinders, and in order to prevent the piston rings from spreading as they pass over the exhaust and inlet ports in the cylinder walls, I use a special type of piston ring having an inwardly extending pin therein located in a suitable aperture in the body of the piston for preventing the piston ring from rotating on the piston. After these rings have been applied, the pistons are so positioned in the cylinders that the split ends of the piston rings coincide with certain of the bridging members 41 and 54. These bridging members thus prevent the rings from spreading during travel of the pistons even though the major portion of the outer surface of each piston ring is unsupported as it passes across the exhaust ports or the inlet ports.

The pistons 20 are provided, as shown, with wrist pins 58 for supporting connecting rods 59 that extend outwardly from the cylinders 14 and 15 for connection to suitable crank shafts mounted about the periphery of the cylinder block 12 and arranged to drive a common flywheel to which the main shaft of my improved internal combustion engine is connected.

As shown best in Figs. 1 and 2, I provide a suitably shaped supporting ring 60 which may be pressed onto the cylinder block from the left-hand end to a position intermediate the two groups of cylinder bores 14 and 15, a suitable key 61 which surrounds the cylinder block 12 being provided for properly positioning the supporting ring 60. The ring 60, as shown best in Fig. 1, is shaped to provide bearing blocks 62 between each group or pair of axially spaced cylinders 14 and 15, the bearing block 62 being adapted to receive bearing caps 63 and anti-friction bearings, such as the roller bearing 64, for supporting a plurality of crank shaft units of the type illustrated in Fig. 6. Each of the crank shaft units 65, one of which is supported in each of the roller bearings 64, consists of a shaft portion 66 adapted to extend through the roller bearing, and a pair of spiral gears 67 and 68, preferably formed integrally with the shaft 66 on opposite ends thereof, which support suitable crank pins 69 adapted to be engaged by the outer ends of the connecting rods 59.

Intermediate the bearing block 62, in circumferentially spaced relation therewith, the ring 60 is provided with a plurality of supporting ears 70 carrying transversely extending pins 71 for supporting suitable rollers 72, one of the rollers 72 being supported between each pair of ears on suitable anti-friction means 73 surrounding the associated pin 71. The rollers 72 are adapted to support an annular flywheel for rotation about the cylinder block 12 and, as shown, this annular flywheel comprises a pair of annular members 74 and 75 (Fig. 1) adapted to be secured together by a plurality of stud bolts 76 which extend through the annular member 75 and threadedly engage the member 74. Each of the annular flywheel members 74 and 75 is provided with an internal row of gear teeth 77 and 78, respectively, consisting of oppositely directed spiral teeth adapted to mesh with the gears 67 and 68, respectively. It will thus be observed that the gears 67 and 68 together with the internal teeth 77 and 78 form in effect a balanced herringbone type gear drive.

Intermediate the rows of gear teeth 77 and 78, I provide a plurality of hardened steel rings 79, 80, and 81 adapted to be clamped tightly together when the flywheel sections 74 and 75 are assembled to provide a hardened steel race for receiving the supporting rollers 72, the rollers 72 and the race formed by the rings 79, 80, and 81 serving to mount the flywheel for rotation about the cylinder block 12.

While the rotation of the flywheel caused by movement of the pistons 20, as will be more fully explained hereafter, may be transmitted to a main shaft in any suitable manner, I provide, in the preferred embodiment of my invention shown, a main shaft 82 which extends through a wall of the outer casing member 10 and is mounted for rotation in a suitable anti-friction bearing 83, suitable sealing means being provided as shown for tightly sealing the engine casing and the shaft while permitting rotation of the shaft with respect to the casing. At its inner end the main shaft 82 is provided with an enlarged cup-shaped portion 84, which in effect forms an outwardly extending spider adapted to be connected to the outer periphery of the flywheel, the outer end of the spider 84 being provided with suitable teeth 85 which extend into slots formed between a plurality of outstanding lugs 86 on the flywheel section 74.

In assembling my improved internal combustion engine, the cylinder head 17 is first rigidly positioned within the annular passageway 16 in the cylinder block 12 in the manner hereinbefore described, and the ring 60 is pressed into the position shown and properly located by means of the key or keys 61 before the pistons 20 are inserted in the cylinder bores 14 and 15. Before the insertion of the pistons 20, however, the associated connecting rods 59 are assembled therewith and each pair of pistons is operatively connected to one of the crank shaft units comprising the shaft 66, the gears 67 and 68, and the crank pins 69. This assembly may be accomplished simply by slipping the outer ends of the connecting rods 59 over the crank pins 69 and securing them in place thereon. Although other means may be provided, I prefer to secure the connecting rods 59 to the crank pins 69 by means of washers 87, as shown best in Fig. 8. Referring to Fig. 8, each of the crank pins 69 is provided with a threaded tap, as shown, adapted to receive a stud bolt 88 which extends through an aperture in the end washer 87, and a locking pin 89 is provided engaging corresponding apertures in the crank pin 69 and the washer 87 to prevent rotation of the washer 87 relative to the crank pin. One important advantage of the improved crank shaft and connecting rod arrangement here shown is that the provision of split ends on the connecting rods is rendered unnecessary and each of the connecting rods may be formed to provide a continuous strap at the outer end adapted completely to encircle a roller bearing disposed about the associated crank pin.

When all of the crank shaft units and connecting rods have been assembled as described above, the pistons may be lowered into the associated cylinder bores until the crank shaft 66 within its associated roller bearing 64 rests in one of the bearing blocks 62, whereupon the bearing caps 63 may be placed in position and rigidly secured by suitable stud bolts as shown. It will, of course, be understood that the roller bearings 64 must be formed in sections in order that they may be easily assembled about the crank shafts 66.

The crank shaft units having now all been properly assembled in their associated bearings, the supporting rollers 72 may be positioned between the supporting ears 70 and the hardened steel rings 79, 80, and 81 properly located with respect to the roller 72, whereupon the two sections 74 and 75 of the annular flywheel may be assembled from opposite ends of the cylinder block 12 and secured together in the position shown in Fig. 1 by means of the stud bolts 76. In assembling the flywheel sections 74 and 75 the crank shaft gears 67 and 68 must be properly located with reference to the internal flywheel teeth 77 and 78 so that all of the pistons 20 occupy identical positions in their associated cylinders 14 and 15.

The next step in the assembly of my improved internal combustion engine is to secure the right-hand portion 11 of the outer casing to the cylinder block 12 by means of the stud bolts 13 and 13a. The end cap plate 44 may now be secured to the block 12, the plug 22 inserted, and the left-hand portion 10 of the outer casing with the main shaft 82 assembled therein may then be applied and tightly secured to the section 11 by suitable stud bolts shown in the right-hand portion of Fig. 1, care being taken to insure that the teeth 85 on the spider 84 of the main shaft extend into the spaces between the lugs 86 on the annular flywheel.

Having in mind the above description of the various parts and the interrelation therebetween, it is thought that a complete understanding of my invention may now be had from a description of the operation. Referring first to Fig. 9 wherein my improved compression-ignition engine is shown somewhat diagrammatically as having a fuel pump 26 connected by means of a conduit 25 to the fuel valve or injector 24, and as having a suitable air compressor 90 connected to supply compressed air to the inlet manifold port 28, it will be observed that the main shaft 91 of the fuel pump is connected through a suitable chain and sprocket arrangement 92 to the main shaft 82 of the internal combustion engine. It is, of course, necessary that the fuel pump be driven in timed relation with the engine itself in order to provide proper timing of the fuel pump 26 and, although the air compressor 90 may be driven from any suitable source, I have shown for purposes of illustration a chain and sprocket connection 93 whereby the air compressor 90 is driven from the main shaft 91 of the fuel pump.

Referring now to Fig. 2, my improved compression-ignition engine is there shown with all of the pistons occupying their respective innermost positions corresponding to the completion of their respective compression strokes, and it will be understood that when the pistons reach this position, the compression chamber 19 contains a body of highly compressed and heated air, the fuel pump 26 being so timed as to supply through the fuel valve or injector 24 a charge of atomized fuel at or near the instant the pistons occupy the position shown. Injection of such a charge of fuel into the compression chamber of course effects combustion therein and drives all of the pistons 20 simultaneously through a power stroke, the outward movement of the pistons effecting rotation of the crank shaft 66 and the associated gears 67 and 68 so as to drive the annular flywheel and the main shaft through the internal gears 77 and 78 on the flywheel. As the pistons 20 reach a predetermined point in their outward movement during the power stroke, the exhaust ports associated with the three uppermost pairs of cylinders 14 and 15, as viewed in Figs. 1 and 2, open so as to connect the cylinders to the exhaust passageways as hereinbefore described. As soon as the exhaust ports open, the products of the combustion within the cylinders begin to flow through the exhaust passageways 47 to 53, inclusive, and out of the exhaust manifold 30 by way of the annular chamber 31, and accordingly a substantial reduction in the pressure that exists within the compression chamber 19 and the cylinders 14 and 15 takes place immediately.

A short interval after the above-referred-to exhaust ports have opened to effect a reduction of the pressure within the cylinders and the compression chamber, the inlet ports associated with the three lowermost pairs of cylinders 14 and 15 are opened due to movement of the associated pistons 20 thereacross and, accordingly, a charge of compressed air is injected into these lowermost cylinders through the inlet ports 36 to 40, inclusive, as hereinbefore described. This charge of compressed air flows upwardly through the three lowermost pairs of cylinders, through the compression chamber 19 and into the uppermost cylinders so as to assist in expelling the products of combustion through the exhaust ports and into the exhaust passageways, and I have found that by properly shaping the walls of the apertures 18, which form reduced end portions on the cylinders 14 and 15, I am able to provide a most efficient scavenging action in the compression chamber.

As shown best in Fig. 1, each of the six apertures 18 in the upper portion of the head 17 is provided with rounded edges at their intersections with the combustion chamber 19, as indicated by the reference numerals 94, and upon the flow of streams of compressed air out of the lowermost cylinders and through the combustion chamber into the uppermost cylinders, a distinct Venturi-tube effect is obtained which is highly effective in entraining any products of combustion that may remain in the combustion chamber so as to efficiently scavenge the combustion chamber. I consider this to be a highly important aspect of my invention.

By the time that the products of combustion have been effectively scavenged from the cylinders and the compression chamber and a charge of compressed air has been introduced therein, the pistons 20 have begun their inward movement and during the initial portion of this movement effect closure of the inlet and exhaust ports. Continued inward movement of the pistons is, of course, effective further to compress the charge of compressed air in the cylinders and the combustion chamber and, as hereinbefore described, when the pistons are at or near their respective innermost positions, shown in Figs. 1 and 2, a charge of atomized fuel is injected through the fuel valve or injector 24 whereupon another power stroke of the pistons is initiated.

It will now be apparent that in my improved compression-ignition engine a plurality of small bore, small stroke pistons are provided, adapted simultaneously to operate through their power and compression strokes so as to provide a very powerful stroke which could otherwise be obtained only by resort to a large cylinder and piston. Each power stroke of the pistons 20 in my improved engine of course effects only a partial rotation of the annular flywheel formed by the sections 74 and 75, the gear ratio between the gears 67, 68 and the internal teeth 77, 78 on the flywheel being so selected as to provide a multiplicity of power strokes during each revolution of the flywheel. While any desired gear ratio may be utilized, I have found it convenient in the embodiment illustrated to employ a gear ratio of 6 to 1 so that six power strokes occur during each revolution of the flywheel, thereby giving a multiple cylinder effect.

With a gear ratio of 6 to 1 between the crank shaft gears 67, 68 and the flywheel, it will, of course, be understood that the pistons operate at a relatively high speed and accordingly considerable heat is developed during the operation of the engine. In order to efficiently dissipate the heat thus developed, the cylinder block 12 is provided with passageways for conducting cooling water therethrough, these passageways being so arranged as to provide a substantially honeycomb arrangement. As shown best in Fig. 2, the left-hand portion 11 of the outer casing of the engine is provided with a cooling-water inlet port 95 which communicates with an annularly extending passageway 96 in the lower portion of the member 11. This passageway 96 is separated from a similar annular extending passageway 97 in the upper portion of the member 11 by suitable cross walls, not shown, in the same manner as the inlet and exhaust passageways 29 and 31 are separated by the cross walls 32, the upper annular passageway 97 being connected to a cooling water outlet port 98. As shown particularly in Fig. 5, the end walls of the cylinder block 12 are provided with a plurality of groups of apertures 99 which extend therethrough and communicate with water spaces 100 (Figs. 2 and 3) that extend transversely through the cylinder block and surround the cylinder bores 14 and 15 and the various inlet and exhaust passageways heretofore described, the opposite end wall of the cylinder block 12 being provided with apertures similar to the apertures 99 for connecting the water spaces 100 to a water space 101 formed in the end cap 44. As shown, certain of the apertures 99 are threaded and adapted to receive the stud bolts 13 which secure the cylinder block 12 to the portion 11 of the outer casing, and these threaded apertures form no part of the cooling-water system, but I have found that the remaining apertures 99 provide for the flow of a sufficient quantity of cooling water through the water spaces 100 in the cylinder block 12. As shown, additional water spaces 103 are provided in the cylinder block 12 adjacent the innermost ends of the cylinders 14 and 15 and these spaces 103 are connected to the water space 100 by the duct 43 hereinbefore described and shown in Fig. 3B.

In order to insure efficient cooling of the innermost ends of the cylinders and the combustion chamber walls, the cylinder head 17 is provided, as shown in Fig. 2, with a plurality of annular passageways 105, 106, and 107 which are connected by means of axially extending apertures 104 located between the apertures 18, as shown best in Fig. 7. The annular passageway 105 is connected to the lower and upper cooling-water passageways 96 and 97 in the member 11 by means of apertures 108 which extend through the right-hand end-wall of the head 17, only one of these apertures 108 being shown in Fig. 2. Similarly, the annular passageway 107 in the head 17 is connected by means of apertures 109 extending through the left-hand end-wall of the head 17 to the water space 101 in the end cap 44, and the passageway 106 is connected by ducts 110 with the water spaces 103.

It will now be apparent that cooling water entering through the inlet 95 passes into the chamber 96 in the portion 11 of the outer casing, and from there circulates through the water spaces 100 in the lower half of the cylinder block 12 and into the water space 101 in the end cap 44. From the water space 101, a portion of the water enters the passageway 107 in the cylinder head 17 and from there flows into the upper portion of the water space 101 and returns through the water spaces 100 in the upper portion of the cylinder block to the chamber 97, from where it is discharged through the outlet 98. At the same time, a portion of the cooling water in the lower chamber 96 passes into the annular passageway 105 in the head 17, and thence to the chamber 97 and out of the outlet 98. In addition, a portion of the cooling water in the water spaces 100 in the lower portion of the block 12 passes upwardly through the duct 43, circulates through the water spaces 103 and through the ducts 110 into the annular space 106 in the head 17. From the space 106, this cooling water circulates through the upper ducts 110 into the spaces 103 in the upper portion of the block 12 and, by way of the passageway 57 (Fig. 3A), enters the spaces 100 in the upper portion of the block. It is thus apparent that the various water spaces and passageways provided effect a thorough circulation of cooling water entirely through the cylinder block 12 and the head 17.

While various means may be provided for effectively lubricating my improved engine, I prefer to form the outer casing of the engine as a tightly sealed casing and to provide a spray-type dry sump lubricating system consisting of a spray device, not shown, for introducing oil under pressure in a fine spray at one or more desired points within the casing, a pair of outlet ports 112 being provided adjacent the bottom of the casing through which lubricating oil, as it collects in the bottom of the casing, may be conducted to a suitable filter and thereafter returned to the spray devices so as to provide a closed lubricating oil system. The motion of the gears 67, 68 and the rotation of the flywheel section 74 and 75, together with the spider 84 on the inner end of the shaft 82, will assist in conducting the lubricating oil thus introduced into the casing to all of the moving parts of the apparatus so as to provide efficient lubrication thereof.

It will, of course, be understood that gear ratios other than the 6 to 1 ratio mentioned above may be utilized, but if changes are made in the gear ratio, then a corresponding change must be made in the speed of the fuel pump 26 so as to maintain proper timing of the fuel pump and insure that charges of fuel are injected into the cylinders at the proper instant.

While I have shown the fuel pump 26 as being provided with a single pump chamber, the pump being driven at such a speed that six impulses occur during each revolution of the flywheel of the internal combustion engine, it will, of course, be understood that a fuel pump having two or more plunger chambers may be utilized, all of the chambers being connected to the same or separate injector valves such as the valve 24 and the speed of the fuel pump being so correlated to the speed of the internal combustion engine as to effect operation of the fuel pump plungers in properly timed sequence to supply a charge of fuel to the compression chamber of the engine at the proper instant during each stroke of the pistons therein.

Although in the embodiment of my invention herein shown and described, I have utilized twelve cylinders and pistons arranged in two groups, each group consisting of six radially extending cylinders, it will, of course, be understood that any desired number of cylinders and pistons may be employed. For example, each group may contain only four pistons, or additional axially spaced groups of cylinders and pistons may be provided. Thus an engine having twenty-four cylinders may be provided by arranging the cylinders in four axially spaced groups with six radially extending cylinders in each group, or by arranging the cylinders in six axially spaced groups having four radially extending pistons in each group. Furthermore, while I have shown the cylinder head 17 so formed as to provide a single compression or combustion chamber common to all of the cylinders so that all of the associated pistons move through their power strokes at the same instant, it will, of course, be understood that a cylinder head may be provided having a plurality of compression chambers therein, each compression chamber being common to a selected group of cylinders. When more than one compression chamber is provided, it is, of course, necessary to utilize a separate fuel valve or injector for each compression chamber, and these separate fuel valves may be arranged to inject a charge of fuel into the respective compression chambers either at the same or at different instants. For example, in the twenty-four cylinder engine hereinbefore described, having four axially spaced groups of cylinders, two compression chambers may be provided in the cylinder head, each compression chamber being associated with two groups of cylinders, and the fuel injectors and the pistons may be so arranged as to cause the twelve cylinders associated with each of the respective compression chambers to fire simultaneously, the two groups firing alternately. With such an arrangement, and with a gear ratio of 6 to 1, twelve power strokes will be provided during each revolution of the flywheel, twelve pistons operating during each power stroke. Although in the examples given above reference has been made to cylinder groups comprising an even number of radially extending cylinders, it will of course be understood that an odd number of cylinders, for example three, five, or seven cylinders, may be employed if desired.

In Fig. 10, I have shown an embodiment of my invention by means of which twelve power strokes during each revolution of the flywheel may be provided without increasing the gear ratio and without increasing the number of cylinders in each block. The arrangement diagrammatically illustrated in Fig. 10 includes a pair of cylinder blocks 115 and 116, each of which is substantially identical with the cylinder block 12 hereinbefore described, the cylinder blocks 115 and 116 being arranged in side-by-side axial relation and secured together so that the axially extending inlet passageways corresponding to the passageways 36 to 40, inclusive, in the cylinder block 12 extend entirely through the two blocks and so that the corresponding exhaust passageways extend entirely through the two blocks. Thus, a single compressed air inlet, indicated by the reference numeral 117, will suffice and all of the exhaust gases are discharged through a single exhaust passageway, indicated by the reference numeral 118. The arrangement of the connecting rods, the crank shaft units, the crank shaft gears, and the supporting rollers for the flywheel in each of the cylinder blocks 115 and 116 is substantially identical with that described above in connection with the cylinder block 12, and all of the crank shaft gears thus provided are arranged to mesh with a common flywheel, here illustrated diagrammatically and represented by the reference numeral 119. It will, of course, be understood that this flywheel 119 must be made up of a plurality of annular sections in order to provide for the assembly thereof in meshing relation with the oppositely directed spiral teeth on the crank shaft gears, and the flywheel may be connected at its left-hand end to a main shaft 120 by a spider 121, similar to spider 84. Preferably, the compression chambers in the cylinder blocks 115 and 116 are separate from each other and a pair of fuel injector valves 122 and 123 are provided, arranged to operate alternately so that the pistons in the cylinder block 116 are displaced 180° from the pistons in the cylinder block 115. Thus, assuming the same gear ratios set forth above, twelve power strokes (six in each cylinder block) will be provided during each revolution of the flywheel 119.

Although my invention is particularly applicable to internal combustion engines of the compression-ignition type, it will be apparent that it is not limited thereto and may likewise be found highly useful in connection with internal combustion engines employing fuels such as gas or gasoline. In order to adapt the internal combustion engine herein shown and described for operation with such fuels, it is, of course, necessary to alter the size of the compression chamber so as to provide a proper compression ratio, the preferred compression ratio in my compression-ignition engine being approximately 17 to 1 and the suitable compression ratio for a gasoline-operated engine being about 6 to 1. In addition, the fuel valve or injector utilized for oil-operation must be replaced by a suitable spark plug or similar ignition means, and a carburetor or a gas-air mixing valve attached to the intake of the compressor so as to supply a combustible mixture to the compression chamber. When so equipped with a carburetor or mixing valve and suitable ignition means, an engine otherwise constructed as described above will operate very satisfactorily as a supercharged internal combustion engine of the type using gas or gasoline as a fuel.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

Having thus described my invention, what I claim and desire to secure by Letters Patent is:

1. In an internal combustion engine, the combination of a substantially cylindrical block having a plurality of annularly spaced passageways extending axially throughout the length thereof and having a plurality of radially extending cylinder bores arranged intermediate said annularly spaced passageways, said block also having a plurality of relatively flat passageways extending axially thereof interconnecting certain of said annularly spaced passageways and intersecting said cylinder bores, the intersections of said relatively flat passageways and said cylinder bores being interrupted only by narrow bridging members extending transversely of said flat passageways and forming continuations of the walls of said cylinder bores, whereby valve ports are provided extending substantially entirely around the circumference of said cylinder bores, and means secured to the opposite ends of said cylinder block for closing one end of all of said axial passageways, and for connecting the other ends of certain of said passageways to inlet means and to exhaust means respectively.

2. In an internal combustion engine, the combination of a substantially cylindrical block formed to provide a plurality of radially extending cylinder bores therein, said block also having a plurality of annularly arranged axial passageways extending inwardly from one end of said block and intersecting said cylinder bores to form valve ports in the walls thereof, said valve ports being interrupted only by narrow bridging members extending across said passageways and forming continuations of the walls of said cylinder bores whereby said valve ports extend substantially entirely around the circumference of said cylinder bores, and means on said one end of said block for connecting certain of said passageways to inlet means and others of said passageways to exhaust means respectively.

3. In an internal combustion engine, the combination of a substantially cylindrical block formed to provide a plurality of axially spaced sets of radially extending cylinder bores the inner ends of which terminate in a common combustion chamber, said block also having formed therein a plurality of annularly disposed axial passageways extending inwardly from one end of said block and intersecting the cylinder bores of said sets to form valve ports in the walls of said cylinder bores, said valve ports being interrupted only by narrow bridging members extending across said passageways and forming continuations of the walls of said cylinder bores whereby said valve ports extend substantially entirely around the circumference of said cylinder bores, and means at said one end of said block for connecting certain of said passageways to common inlet means and others of said passageways to common exhaust means respectively.

4. In an internal combustion engine, the combination of a substantially cylindrical block having a plurality of annularly spaced axial passageways extending inwardly from one end of said block and having a plurality of radially extending cylinder bores arranged intermediate said annularly spaced passageways, said block also having a plurality of relatively flat passageways extending axially thereof interconnecting certain of said annularly spaced passageways and intersecting said cylinder bores, the intersections of said relatively flat passageways and said cylinder bores being interrupted only by narrow bridging members extending transversely of said flat passageways and forming continuations of the walls of said cylinder bores, whereby valve ports are provided extending substantially entirely around the circumference of said cylinder bores, means for closing one end of said axial passageways, and means for connecting the open ends of certain of said passageways to inlet means and others of said passageways to exhaust means respectively.

5. In an internal combustion engine, the combination of a substantially cylindrical block having a plurality of axially spaced sets of radially extending cylinder bores and having a plurality of annularly spaced axial passageways extending inwardly from one end of said block intermediate said radially extending cylinder bores, said block also having a plurality of relatively flat passageways extending axially thereof interconnecting certain of said annularly spaced passageways and intersecting all of said cylinder bores, the intersections of said relatively flat passageways and said cylinder bores being interrupted only by narrow bridging members extending transversely of said flat passageways and forming continuations of the walls of said cylinder bores, whereby valve ports are provided extending substantially entirely around the circumference of each of said cylinder bores in each of said axially spaced sets, and means for connecting certain of said passageways to inlet means and certain of said other passageways to exhaust means respectively.

6. In an internal combustion engine, the combination of a substantially cylindrical block having a plurality of axially spaced sets of radially extending cylinder bores and having a plurality of annularly spaced axial passageways extending inwardly from one end of said block intermediate said radially extending cylinder bores, said block also having a plurality of relatively flat passageways extending axially thereof interconnecting certain of said annularly spaced passageways and intersecting all of said cylinder bores to form valve ports in the walls of each of the cylinder bores in each of said axially spaced sets, and means secured to said cylinder block for connecting certain of said passageways to common inlet means and others of said passageways to exhaust means respectively.

RASMUS M. HVID.